United States Patent Office 3,017,316
Patented Jan. 16, 1962

3,017,316
METHOD OF BLEACHING WOOD PULP WITH CHLORINE DIOXIDE AND SODIUM BOROHYDRIDE
William Howard Rapson, Toronto, Ontario, Canada, assignor to Hooker Chemical Corporation, Niagara Falls, N.Y., a corporation of New York
No Drawing. Filed June 25, 1958, Ser. No. 744,337
2 Claims. (Cl. 162—80)

This invention relates to a process for manufacturing whiter and more stable wood pulps.

It is now possible to bleach many types of wood pulps to 89 to 91% brightness with relatively little loss in strength. However, such high brightness is of little significance if the pulp becomes yellow on storage. Therefore the tendency of the pulp to "revert" in brightness and the factors influencing such reversion have become very important.

Since practically all the lignin and resin components of the original wood are removed during the treatments which produce such high levels of brightness, it is apparent that the variations found in the degree of colour reversion for very white pulps must be attributed largely to the effect of the various treatments involved in bleaching on the carbohydrate fraction of the wood which remains in the final pulp.

This "colour reversion" has been attributed to many factors such as the presence of extraneous materials such as lignin, resin, iron etc. While such substances may play a role in colour reversion, I have found that a very important factor determining the rate and extent of colour reversion is the number of carbonyl groups introduced into the cellulose molecule by the various oxidizing chemical treatments to which such materials are subjected. For very white wood pulps and for purified cotton, the extent of yellowing was found to be related to the carbonyl group content of the cellulose.

It is an object of this invention to improve both the brightness and the colour stability by bleaching wood pulp with chlorine dioxide and subsequently with sodium borohydride. This combination of bleaching stages produces pulp which is whiter and more resistant to yellowing on ageing than that produced by any other combination of bleaching steps heretofore disclosed.

The value of chlorine dioxide as a bleaching agent for pulp is well known and it is widely used. When used under the best conditions, chlorine dioxide bleaches pulp to very high whiteness without appreciably damaging the strength of the pulp. This object is achieved because chlorine dioxide readily oxidizes lignin, resin and other coloured components without any significant chemical reaction with the carbohydrate fraction of the pulp.

However, the fact that chlorine dioxide does not react with the carbohydrates has a disadvantage as well as an advantage. The advantage lies in the fact that the chlorine dioxide does not introduce carbonyl groups into the carbohydrates, and therefore does not introduce colour instability into the pulp. The disadvantage is that the chlorine dioxide does not oxidize aldehyde groups to carboxyl groups to any significant extent, and thereby eliminate the tendency toward colour reversion caused by such carbonyl groups. Such objectionable carbonyl groups might be present in the carbohydrates in the original wood or might arise through the pulping or bleaching treatments applied prior to the chlorine dioxide treatment.

This disadvantage of chlorine dioxide bleaching may readily be corrected by following the chlorine dioxide treatment with a treatment with sodium borohydride. The treatment of cellulosic materials with a water solution of sodium borohydride greatly improves their colour stability, as disclosed in co-pending patent application Serial Number 744,318, filed June 25, 1958, now abandoned. The combination of chlorine dioxide treatment followed by other oxidizing agents has previously been disclosed. For example, Rapson (U.S. Patent 2,587,064 (1952)), (Canadian Pat. 470,478 (1951)), discloses the combination of chlorine dioxide followed by hypochlorite treatment which gives high whiteness but which tends to lower the strength of the bleached pulp. Casciani and Storin (U.S. Patent 2,494,542 (1950)), (Canadian Pat. 448,883, (1948)), disclose the combination of chlorine dioxide followed by peroxide treatment which gives high whiteness and improved colour reversion, but which also causes some loss of strength to the pulp. The combination of chlorine dioxide followed by sodium borohydride which I am disclosing herein is novel in that a strong reducing agent follows an oxidizing agent, to give high whiteness and colour stability without loss of strength in the resulting pulp.

The treatment with chlorine dioxide may be carried out under any conditions normally used for such a bleaching treatment. For example, temperatures from 0 to 90 degrees centigrade may be used, at 2 to 20% consistency, for 30 minutes to 6 hours, at any pH between 8 and 1, with 0.1 to 3% chlorine dioxide on pulp.

The treatment with sodium borohydride in water solution may be carried out under a wide range of conditions of temperature and concentration. The reaction takes place very conveniently at ordinary temperatures such as from 0 to 50° C. but higher temperatures may be used to speed up the reaction if desired. Any practical ratio of pulp to water may be used, but the higher the consistency the shorter the time of treatment required and the lower the temperature required to complete the reaction. The amount of sodium borohydride used may cover the range from 0.1 to 10% on pulp. The reducing action of the sodium borohydride on carbonyl groups takes place over a wide range of pH, but an unbuffered solution of sodium borohydride normally adjusts itself to about pH 9.5 to pH 10.5 which is quite satisfactory for the treatment of pulp. Therefore it is usually not necessary to add any buffers to adjust the pH.

The effectiveness of this combined treatment may be measured by determining the brightness of the pulp, i.e. the reflectance at 457 millimicrons wavelength, compared with that of magnesium oxide in the General Electric brightness tester, or any other suitable instrument. Then the pulp may be heated in an oven at 105° C. for 18 hours, and the brightness may be measured again. The higher the brightness before heating and the lower the drop in brightness due to heating the better the pulp from a colour and colour reversion standpoint.

EXAMPLE 1

A commercial bleached spruce sulphite pulp was treated with 1.0% chlorine dioxide on pulp, at pH 6, at 6% consistency, at 70° C., for 3 hours. The pulp was then washed, and treated with 1.0% sodium borohydride on pulp, at 5% consistency, at 25° C., for 18 hours. A similar sample of pulp was treated with chlorine dioxide alone, and another with sodium borohydride alone, under the conditions given above for each treatment.

Each sample was tested for brightness before and after heating in an oven at 105° C. for 18 hours. Viscosity in cupriethylenediamine solution, copper number, carboxyl group content and solubility on boiling in 7.14% sodium hydroxide solution for 3 hours were also determined by standard methods. The results obtained are shown in Table 1.

Table 1

| Sample | Brightness, percent | Brightness After Ageing, percent | Viscosity, cp. | Hot Alkali Solubility, percent | Copper Number | Carboxyl Group Content, mg. per 100 g. |
|---|---|---|---|---|---|---|
| Spruce sulphite pulp as received | 84.9 | 81.3 | 16.5 | 17.8 | 1.8 | 38.1 |
| After treatment with 1% ClO₂ on pulp | 95.9 | 86.5 | 16.0 | 17.5 | 1.8 | 35.4 |
| After treatment with 1% NaBH₄ on pulp | 90.5 | 86.0 | 19.6 | 10.7 | 0.7 | 37.5 |
| After treatment with 1% ClO₂ on pulp and 1% NaBH₄ on pulp | 95.4 | 90.0 | 18.9 | 11.3 | 0.7 | 35.3 |

EXAMPLE 2

A part bleached hardwood semi-chemical pulp was treated with 1% chlorine dioxide and then with 0.5% sodium borohydride under the conditions for each treatment described in Example 1. After washing and drying, brightness, brightness after heating at 105° C. for 18 hours, and viscosity in cupriethylene diamine solution were determined, as shown in Table 2.

Table 2

| | Brightness, percent | Brightness, After Ageing, percent | Viscosity, cp. |
|---|---|---|---|
| Part-bleached hardwood semi-chemical pulp | 58.9 | 55.9 | 23.6 |
| After treatment with 1% ClO₂ | 87.0 | 77.9 | 21.7 |
| After treatment with 1% ClO₂ and then 0.5% NaBH₄ | 88.7 | 83.1 | 26.1 |

EXAMPLE 3

A part-bleached kraft spruce kraft pulp was treated with 0 to 1.0% chlorine dioxide on pulp, at 6% consistency, at 70° C., for 3 hours. Each sample of pulp was washed, and then treated with 0 to 1.0% sodium borohydride, at 10% consistency, at 25° C. for 18 hours. After washing, making into sheets and drying, the resulting pulps were tested for brightness before and after heating in an oven at 105° C. for 3 hours, with the results shown in Table 3.

Table 3

| Percent NaBH₄ on pulp | Brightness before and after ageing with varied amounts of chlorine dioxide | | | | | | | | | | | | Percent ClO₂ Brightness |
|---|---|---|---|---|---|---|---|---|---|---|---|---|---|
| | 0 | | 0.2 | | 0.4 | | 0.6 | | 0.8 | | 1.0 | | |
| | B. | A. | B. | A. | B. | A. | B. | A. | B. | A. | B. | A. | |
| 0 | 78.5 | 77.8 | 91.6 | 89.2 | 91.6 | 90.2 | 92.1 | 90.2 | 92.3 | 90.6 | 92.4 | 91.0 | |
| 0.2 | 84.4 | 83.2 | 93.1 | 91.8 | 93.5 | 92.3 | 93.2 | 92.4 | 93.6 | 92.8 | 93.5 | 92.7 | |
| 0.5 | 86.0 | 84.6 | 94.2 | 92.7 | 93.3 | 92.4 | 93.2 | 92.4 | 93.5 | 93.3 | 93.5 | 92.8 | |
| 1.0 | 87.8 | 85.6 | 94.2 | 92.6 | 93.9 | 92.6 | 93.8 | 92.5 | 94.1 | 93.5 | 93.8 | 93.1 | |

The examples show that chlorine dioxide improves brightness before and after heating the pulp, but that the brightest and most stable pulps are obtained by treating with chlorine dioxide followed by sodium borohydride.

Example 1 shows that the increase in brightness stability is accompanied by a decrease in hot alkali solubility and in copper number, both of which are related to the carbonyl group content of the pulp. Carboxyl group content is affected very little, as would be expected.

What I claim as my invention is:

1. A process for bleaching wood pulp which comprises treating pulp with an aqueous solution of chlorine dioxide at from 50 to 90 degrees centigrade, at from one to fifteen percent consistency, for from thirty minutes to five hours at a pH of from one to eight; washing, and then contacting the same pulp with an aqueous solution of sodium borohydride.

2. A process for bleaching wood pulp which comprises treating pulp with an aqueous solution of chlorine dioxide at from 50 to 90 degrees centigrade at from one to fifteen percent consistency, for from thirty minutes to five hours at a pH of from one to eight, washing, and then contacting the same pulp with an aqueous solution of sodium borohydride at from 10 to 90 degrees centigrade, at from one to fifteen percent consistency for from five minutes to twenty-four hours.

References Cited in the file of this patent

UNITED STATES PATENTS

| 2,358,866 | MacMahon | Sept. 26, 1944 |
| 2,989,333 | Jullander | Aug. 4, 1959 |

FOREIGN PATENTS

| 567,774 | Great Britain | Mar. 2, 1945 |

OTHER REFERENCES

Chemical Abstracts (1), vol. 50, p. 2163d, 1956.
Chemical Abstracts (1a), vol. 50, p. 9735g, 1956.
Chemical Abstracts (2), vol. 50, p. 3755c, 1956.
Chemical Abstracts (3), vol. 50, p. 563d, 1956.
Chemical Abstracts (4), vol. 47, p. 11723a, 1953.
Bulletin 502A, Metal Hydrides, Inc., Feb. 15, 1950, 2 pp.